(12) United States Patent
Lin et al.

(10) Patent No.: US 12,346,412 B2
(45) Date of Patent: Jul. 1, 2025

(54) INTERFACES FOR ASSISTED DEFECT RECOGNITION SYSTEMS

(71) Applicant: Illinois Tool Works Inc., Glenview, IL (US)

(72) Inventors: Sean Lin, Hopkins, MN (US); Joseph Schlecht, Rogers, MN (US); Caleb Nelson Hay, Minneapolis, MN (US); Eric Ferley, Minneapolis, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 73 days.

(21) Appl. No.: 17/488,844

(22) Filed: Sep. 29, 2021

(65) Prior Publication Data

US 2022/0108129 A1    Apr. 7, 2022

Related U.S. Application Data

(60) Provisional application No. 63/086,963, filed on Oct. 2, 2020.

(51) Int. Cl.
| | | |
|---|---|---|
| *G06F 18/40* | (2023.01) | |
| *G06F 3/04842* | (2022.01) | |
| *G06F 3/04847* | (2022.01) | |
| *G06F 18/214* | (2023.01) | |
| *G06T 7/00* | (2017.01) | |

(52) U.S. Cl.
CPC .......... *G06F 18/40* (2023.01); *G06F 3/04842* (2013.01); *G06F 3/04847* (2013.01); *G06F 18/214* (2023.01); *G06T 7/0004* (2013.01); *G06T 2207/10116* (2013.01)

(58) Field of Classification Search
CPC ... G06F 3/04842; G06F 3/04847; G06F 18/40
See application file for complete search history.

(56) References Cited

U.S. PATENT DOCUMENTS

| | | |
|---|---|---|
| 4,896,278 A | 1/1990 | Grove |
| 6,456,899 B1 | 9/2002 | Gleason et al. |
| (Continued) | | |

FOREIGN PATENT DOCUMENTS

EP    3291081    3/2018

OTHER PUBLICATIONS

Anonymous: "NI Vision NI Vision for LabVIEW™ User Manual NI Vision for abVIEW User Manual", Nov. 1, 2005 (Nov. 1, 2005), XP055875833, Retrieved from the Internet: URL:https://www.ni.com/pdf/manuals/371007b. pdf [retrieved on Jan. 3, 2022].

(Continued)

*Primary Examiner* — Tan H Tran
(74) *Attorney, Agent, or Firm* — McAndrews, Held & Malloy, Ltd.

(57) ABSTRACT

Described herein are examples of interfaces for designing and/or configuring custom assisted defect recognition (ADR) systems and/or workflows. In some examples, the ADR systems and/or workflows may be designed and/or configured using visual tools, such as, for example, node based processing tools. In some examples, the ADR workflows may be used to analyze two dimensional (2D) and/or three dimensional (3D) image scans, such as might be generated by industrial X-ray scanning systems.

16 Claims, 7 Drawing Sheets

(56) References Cited

U.S. PATENT DOCUMENTS

| | | | | |
|---|---|---|---|---|
| 6,763,515 | B1 * | 7/2004 | Vazquez | G06F 8/36 |
| | | | | 717/109 |
| 8,302,072 | B2 | 10/2012 | Chandhoke | |
| 10,235,477 | B2 * | 3/2019 | Caltagirone | G06F 30/20 |
| 2007/0018980 | A1 * | 1/2007 | Berteig | G06T 15/80 |
| | | | | 345/426 |
| 2015/0012811 | A1 * | 1/2015 | Chan | G06F 16/958 |
| | | | | 715/234 |
| 2016/0314351 | A1 | 10/2016 | Mos | |
| 2017/0060348 | A1 * | 3/2017 | Kongot | G06T 11/206 |
| 2020/0151496 | A1 * | 5/2020 | Cao | G06F 18/2113 |
| 2021/0174941 | A1 * | 6/2021 | Mathur | H04L 63/102 |
| 2022/0050584 | A1 * | 2/2022 | Dines | G06F 9/451 |

OTHER PUBLICATIONS

Chin R T: "Automated Visual Inspection: 1981 to 1987", Computer Vision Graphics and Image Processing, Academic Press, Duluth, MA, US, vol. 41, No. 3, Mar. 1, 1988 (Mar. 1, 1988), pp. 346-381, XP000000275, DOI: 10.1016/0734-189X(88)90108-9.

Int'l Search Report and Written Opinion Appln No. PCT/US2021 1052593 mailed Jan. 21, 2022.

Radlak Krystian et al: "Adaptive Vision Studio—Educational tool for image processing learning", 2015 IEEE Frontiers in Education Conference (FIE), IEEE, Oct. 21, 2015 (Oct. 21, 2015), pp. 1-8, XP032826135, DOI: 10.1109/FIE.2015.7344309 ISBN: 978-1-4799-8454-1 [retrieved on Dec. 2, 2015].

* cited by examiner

INTERFACES FOR ASSISTED DEFECT RECOGNITION SYSTEMS

CROSS REFERENCE TO RELATED APPLICATIONS

This application claims priority to, and the benefit of, U.S. Provisional Patent Application No. 63/086,963, entitled "DESIGN INTERFACES FOR ASSISTED DEFECT RECOGNITION SYSTEMS," filed Oct. 2, 2020, the entire contents of which being hereby incorporated by reference.

TECHNICAL FIELD

The present disclosure generally relates to assisted defect recognition systems and, more particularly, to design interfaces for assisted defect recognition systems

BACKGROUND

X-ray scanning is sometimes used to inspect parts used in industrial applications, such as, for example, aerospace, automotive, electronic, medical, pharmaceutical, military, and/or defense applications. X-ray images can be used to check the part(s) for cracks, flaws, or defects that may not normally be visible to the human eye. However, the definition of a flaw or defect may vary depending on the part and/or application.

Limitations and disadvantages of conventional and traditional approaches will become apparent to one of skill in the art, through comparison of such systems with the present disclosure as set forth in the remainder of the present application with reference to the drawings.

BRIEF SUMMARY

The present disclosure is directed to design interfaces for assisted defect recognition systems, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

Figure 1:
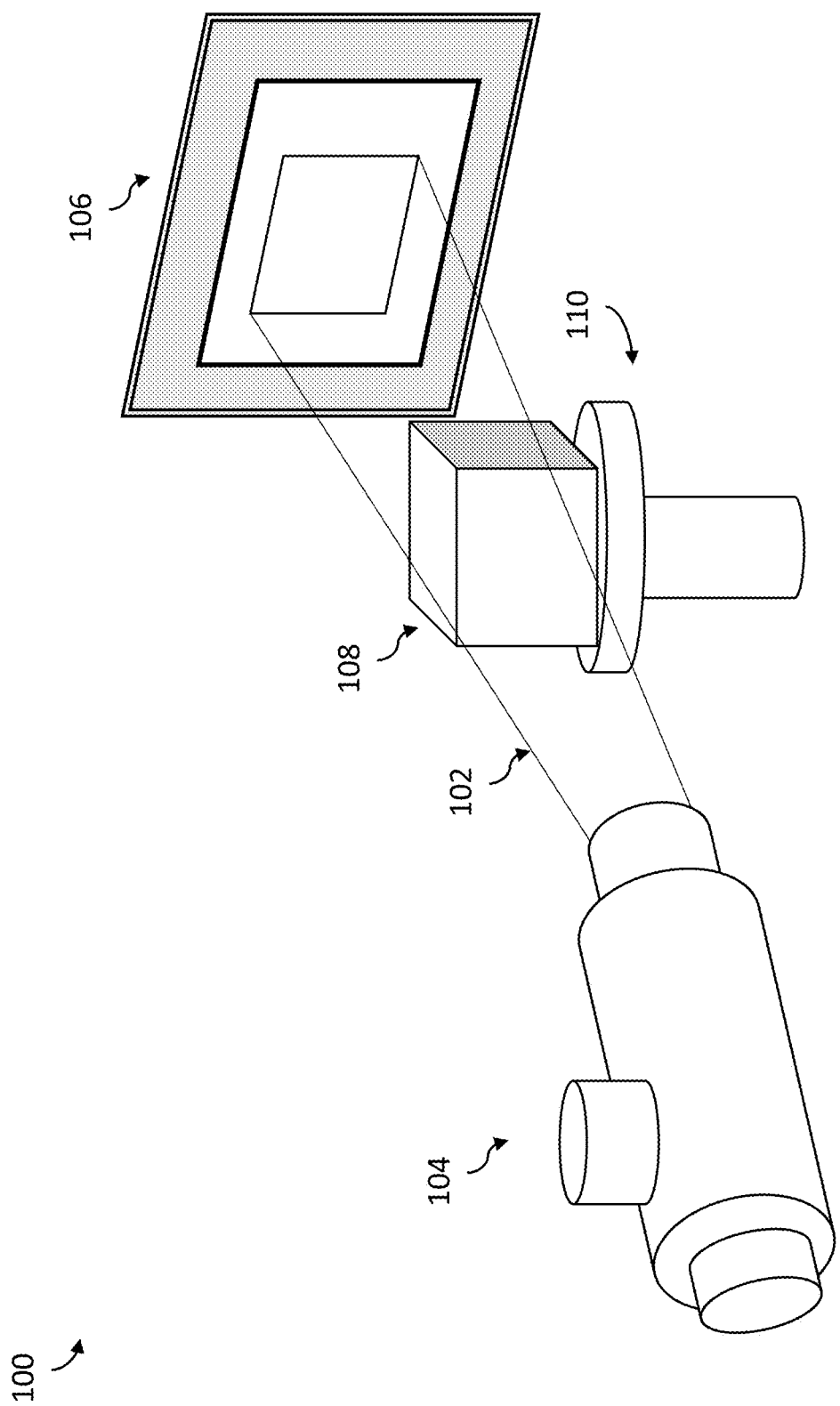
FIG. 1 shows an example industrial X-ray scanning system, in accordance with aspects of this disclosure.

The figures are not necessarily to scale. Where appropriate, the same or similar reference numerals are used in the figures to refer to similar or identical elements. For example, reference numerals utilizing lettering (e.g., repository 258*a*, repository 258*b*) refer to instances of the same reference numeral that does not have the lettering (e.g., repositories 258)

DETAILED DESCRIPTION

Some examples of the present disclosure relate to interfaces for designing and/or configuring custom assisted defect recognition systems and/or workflows. As used herein, assisted defect recognition (ADR) refers to assistance provided to a human operator or automated system by a machine or programmable apparatus for the purpose of quality assurance inspection of industrial parts. As used herein, an ADR workflow refers to an arrangement and/or ordered sequence of interconnected machine operations organized and/or performed for assisted defect recognition.

In some examples, ADR workflows may be designed and/or configured using visual tools, such as, for example, node based processing/programming tools. In some examples, these visual (e.g., node based) processing/programming tools may be easier, more intuitive, less cumbersome/complex, and/or less daunting to use than more conventional text based programming tools. In some examples, the more accessible and/or intuitive visual (e.g., node based) processing/programming tools may be helpful for industrial workers inspecting industrial parts.

In some examples, an ADR designer provides a design interface configured to allow custom configurations of ADR workflows using the visual (e.g., node based) processing/programming tools. The ADR workflows may be used to analyze two dimensional (2D) and/or three dimensional (3D) radiography images/scans, such as might be generated by industrial X-ray imaging/scanning systems. While node-based programming and/or processing tools may be conventionally employed for computer generated imaging (CGI) and computer graphics, these conventional tools are poorly equipped for the type of processing necessary for analysis of industrial radiography images, and/or for designing ADR workflows for analysis of industrial radiography (e.g., X-ray) images.

Some examples of the present disclosure relate to an assisted defect recognition (ADR) control system, comprising: a display; a processor; and a computer readable storage medium comprising computer readable instructions which, when executed, cause the processor to: provide a design interface via the display, the design interface comprising a canvas and a plurality of image processing blocks, each of the image processing blocks being representative of an image processing function, wherein an image processing block of the image processing blocks can be placed on the canvas to create an instance of the image processing block, configure an image processing workflow based on instances of the image processing blocks on the canvas and connections between the instances of the image processing blocks on the canvas, perform an analysis of an input image via the image processing workflow, and output a result of the analysis.

In some examples, the computer readable instructions, when executed, further cause the processor to: enable a user to connect inputs and outputs of the instances of the image processing blocks on the canvas of the design interface, and configure the image processing workflow based on the connections of the inputs and outputs of the instances of the image processing blocks on the canvas. In some examples, the computer readable instructions, when executed, further cause the processor to: enable the user to specify a value or range of a parameter used in at least one of the instances of the image processing blocks, and configure the image processing workflow based on the value or range of the parameter. In some examples, the computer readable instructions, when executed, further cause the processor to determine the value or range of the parameter based on a training of the image processing workflow using a plurality of training images.

In some examples, the result is an image, a portion of an image, a number, or a Boolean value. In some examples, the computer readable instructions, when executed, further cause the processor to preview an intermediate result of the analysis in response to selection of the instance of the image processing block on the canvas. In some examples, the computer readable instructions, when executed, further cause the processor to enable a user to group a plurality of image processing blocks together, save the group as a compound image processing block, and add the compound image processing block to the canvas in response to selection of the compound image processing block for addition to the canvas.

In some examples, the computer readable instructions, when executed, further cause the processor to: access an image generated by an X-ray scanner or a three dimensional (3D) volume constructed from images generated by the X-ray scanner, the image or 3D volume being representative of a component or assembly scanned by the X-ray scanner, and use the image or a slice of the 3D volume as the input image. In some examples, the image processing blocks comprise an image filter function, a region selection function, an edge detection function, an object selection function, a brightness adjustment function, an image expansion function, an image information function, an image difference function, an image annotation function, an image combination function, an image slicing function, a line profiling function, a signal to noise ratio function, a contrast to noise ratio function, or a thresholding function. In some examples, the result comprises a first result, the image processing workflow comprises a first image processing workflow, and the computer readable instructions, when executed, further cause the processor to calibrate one or more parameters of the first image processing workflow based on a second result of a second image processing workflow.

Some examples of the present disclosure relate to a method of facilitating design of custom ADR workflows, comprising: providing a design interface via a display, the design interface comprising a canvas and a plurality of image processing blocks, each of the image processing blocks being representative of an image processing function, wherein an image processing block of the image processing blocks can be placed on the canvas to create an instance of the image processing block; configuring, via processing circuitry, an image processing workflow based on instances of the image processing blocks on the canvas and connections between the instances of the image processing blocks on the canvas; performing an analysis of an input image via the image processing workflow, and outputting a result of the analysis.

In some examples, the method further comprises enabling a user to connect inputs and outputs of the instances of the image processing blocks on the canvas of the design interface; and configuring the image processing workflow based on the connections of the inputs and outputs of the instances of the image processing blocks on the canvas. In some examples, the method further comprises: enabling the user to specify a value or range of a parameter used in at least one of the instances of the image processing blocks; and configuring the image processing workflow based on the value or range of the parameter. In some examples, the method further comprises determining the value or range of the parameter based on a training of the image processing workflow using a plurality of training images.

In some examples, the result is an image, a portion of an image, a number, or a Boolean value. In some examples, the method further comprises previewing an intermediate result of the analysis in response to selection of the instance of the image processing block on the canvas. In some examples, the method further comprises enabling a user to group a plurality of image processing blocks together, save the group as a compound image processing block, and add the compound image processing block to the canvas in response to selection of the compound image processing block for addition to the canvas.

In some examples, the method further comprises accessing an image generated by an X-ray scanner or a three dimensional (3D) volume constructed from images generated by the X-ray scanner, the image or 3D volume being representative of a component or assembly scanned by the X-ray scanner; and using the image or a slice of the 3D volume as the input image. In some examples, the image processing blocks comprise an image filter function, a region selection function, an edge detection function, an object selection function, a brightness adjustment function, an image expansion function, an image information function, an image difference function, an image annotation function, an image combination function, an image slicing function, a line profiling function, a signal to noise ratio function, a contrast to noise ratio function, or a thresholding function. In some examples, the result comprises a first result, the image processing workflow comprises a first image processing workflow, and the method further comprises calibrating one or more parameters of the first image processing workflow based on a second result of a second image processing workflow.

FIG. 1 shows an example industrial X-ray scanning system 100. The example X-ray scanning system 100 may be used to perform non-destructive testing (NDT) and/or other scanning applications. As shown, the X-ray scanning system 100 directs X-rays 102 from an X-ray emitter 104 to an X-ray detector 106 through a workpiece (and/or part) 108.

In some examples, the X-ray emitter 106 may comprise an X-ray tube configured to emit cone or fan shaped X-ray radiation. In some examples, the workpiece 108 may be an industrial component and/or an assembly of components (e.g., an engine cast, microchip, bolt, etc.). In the example of FIG. 1, a workpiece positioner 110 retains the workpiece 108 in the path of the X-ray radiation 102, between the X-ray emitter 104 and detector 106.

In some examples, the workpiece positioner 110 may be configured to move and/or rotate the workpiece 108 so that a desired portion and/or orientation of the workpiece 108 is located in the path of the X-ray radiation 102. In some examples, the X-ray scanning system 100 may further include one or more actuators configured to alter the position and/or orientation of the X-ray emitter 104, the X-ray detector 106, and/or the workpiece positioner 110. In some examples, the X-ray scanning system 100 may include a housing that encloses the X-ray emitter 104, the X-ray detector 106, the workpiece positioner 110, and/or portions of the X-ray scanning system 100. While the example of FIG. 1 includes an X-ray emitter 104 and an X-ray detector 106, in other examples the scanning system 100 may perform scanning using radiation in other wavelengths (e.g., Gamma, Neutron, etc.).

In some examples, the X-ray detector 106 may generate 2D digital images (e.g., radiographic images) based on X-ray radiation 102 incident on the X-ray detector 106. In some examples, the 2D images may be generated by the X-ray detector 106 itself. In some examples, the 2D images may be generated by the X-ray detector 106 in combination with a computing system in communication with the X-ray detector 106.

In some examples, the 2D images generated by the X-ray detector 108 (and/or associated computing system(s)) may be combined to form three dimensional (3D) volumes and/or images. In some examples, 2D image slices of the 3D volumes/images may also be formed. While the term "image" is used herein as a shorthand, it should be understood that an "image" may comprise representative data until that data is visually rendered by one or more appropriate components (e.g., a display screen, a graphic processing unit, an X-ray detector 108, etc.).

In some examples, the X-ray detector 106 may include a fluoroscopy detection system and/or a digital image sensor configured to receive an image indirectly via scintillation, and/or may be implemented using a sensor panel (e.g., a CCD panel, a CMOS panel, etc.) configured to receive the X-rays directly, and to generate the digital images. In some examples, the X-ray detector 106 may use a solid state panel coupled to a scintillation screen and having pixels that correspond to portions of the scintillation screen. Example solid state panels may include CMOS X-ray panels and/or CCD X-ray panels.

Figure 2:
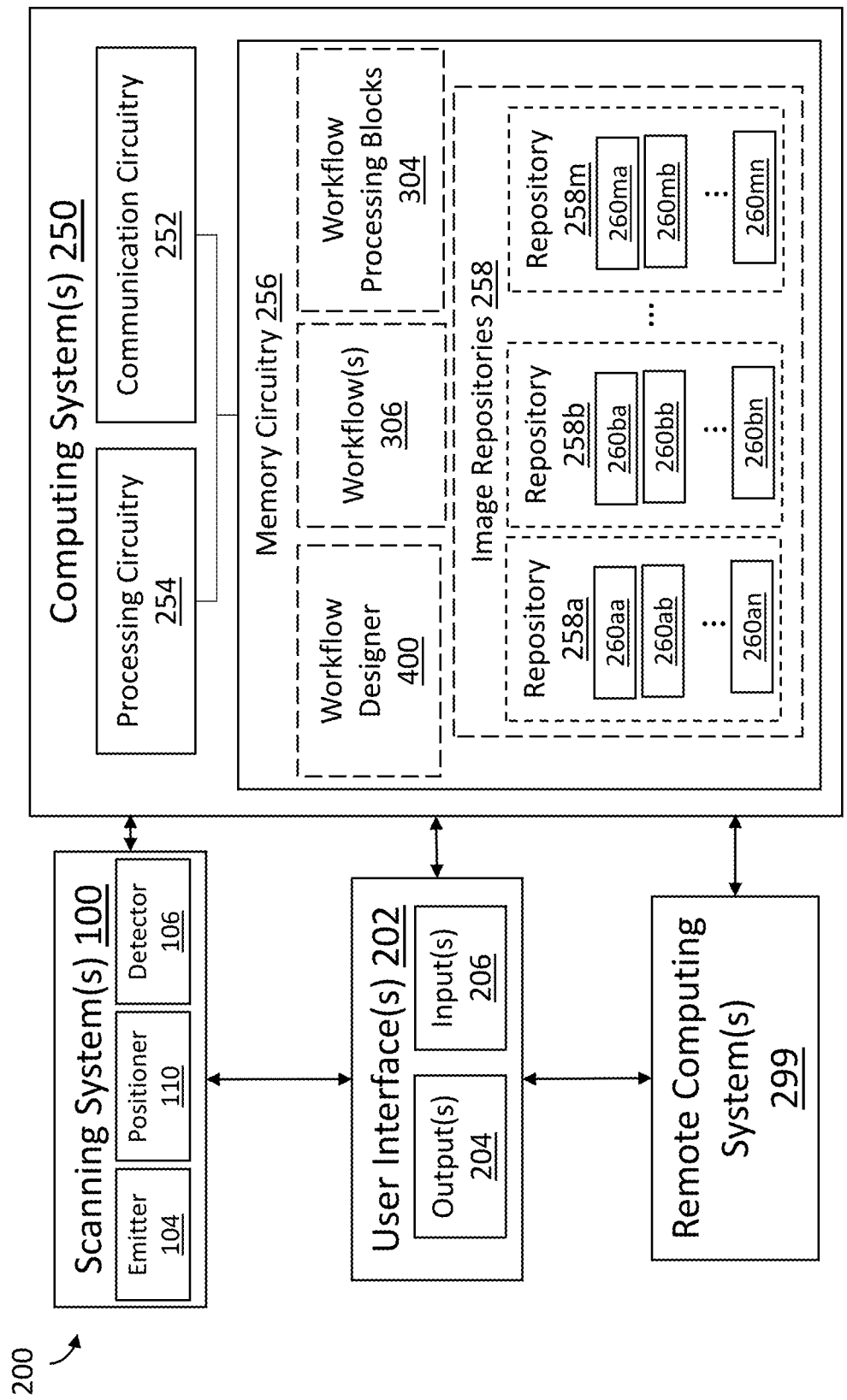
FIG. 2 is a block diagram of an example part analysis system, in accordance with aspects of this disclosure.

FIG. 2 shows an example part analysis system 200. As shown, the part analysis system 200 includes the X-ray scanning system 100, a computing system 250, a user interface (UI) 202, and a remote computing system 299. While only one X-ray scanning system 100, computing system 250, UI 202, and remote computing system 299 are shown in the example of FIG. 2, in some examples the part analysis system 200 may include several X-ray scanning systems 100, computing systems 250, UIs 202, and/or remote computing systems 299.

In the example of FIG. 2, the X-ray scanning system 100 is in electrical communication with the computing system(s) 250 and UI(s) 202. In some examples, the X-ray scanning system 100 may also be in electrical communication with the remote computing system(s) 299. In some examples, the electrical communication may be conducted via one or more wired or wireless mediums.

In some examples, the X-ray scanning system 100 may include a controller to facilitate operation of the X-ray scanning system 100. In some examples, the controller may facilitate generation of 2D images by the X-ray scanning system 100. In some examples, the controller may facilitate construction of one or more 3D images/volumes (e.g., representative of a workpiece 108) using a computed tomography of a series of 2D images (e.g., generated by the X-ray scanning system 100 when scanning the workpiece 108).

In some examples, the X-ray scanning system 100 may include communication circuitry to facilitate communication between the X-ray scanning system 100 and other systems. In some examples, the X-ray scanning system 100 may include the computing system 250 and/or UI 202. In some examples, the computing system 250 may facilitate construction of one or more 3D images/volumes (e.g., representative of a workpiece 108) using a computed tomography of a series of 2D images (e.g., generated by the X-ray scanning system 100 when scanning the workpiece 108). In some examples, the X-ray scanning system 100 may communicate one or more (e.g., 2D or 3D) digital images generated by the X-ray scanning system 100 to the UI 202 and/or computing system 250.

In the example of FIG. 2, the UI 202 is in (e.g., electrical) communication with the X-ray scanning system(s) 100, computing system(s) 250, and remote computing system(s) 299. In some examples, the UI 202 may be part of the X-ray scanning system(s) 100, computing system(s) 250, and/or remote computing system(s) 299. As shown, the UI 202 includes one or more input devices 204 and/or output devices 206. In some examples, the one or more input devices 204 may comprise one or more touch screens, mice, keyboards, buttons, switches, slides, knobs, microphones, dials, and/or other electromechanical input devices. In some examples, the one or more output devices 206 may comprise one or more display screens, speakers, lights, haptic devices, and/or other devices. In some examples, the UI 202 may further include one or more receptacles configured for connection to (and/or reception of) one or more external memory devices (e.g., floppy disks, compact discs, digital video disc, flash drive, etc.). In some examples, a user may provide input to, and/or receive output from the X-ray scanning system(s) 100, computing system(s) 250, and/or remote computing system(s) 299 via the UI(s) 202.

In the example of FIG. 2, the computing system 250 is in (e.g., electrical) communication with the X-ray scanning system(s) 100, UI(s) 202, and remote computing system(s) 299. In some examples, the communication may be direct communication (e.g., through a wired and/or wireless medium) or indirect communication, such as, for example, through one or more wired and/or wireless networks (e.g., local and/or wide area networks). In some examples, a UI 202 may be part of the computing system 250. In some examples, the computing system 250 may be part of a scanning system 100. In some examples, the remote computing system(s) 299 may be similar or identical to the computing system 250.

In the example of FIG. 2, the computing system 250 includes communication circuitry 252, processing circuitry 254, and memory circuitry 256 interconnected with one another via a common electrical bus. In some examples, the memory circuitry 256 may comprise and/or store machine readable instructions. In some examples, the processing circuitry 254 may comprise one or more processors. In some examples, the communication circuitry 252 may include one or more wireless adapters, wireless cards, cable adapters, wire adapters, radio frequency (RF) devices, wireless communication devices, Bluetooth devices, IEEE 802.11-compliant devices, WiFi devices, cellular devices, GPS devices, Ethernet ports, network ports, lightning cable ports, cable ports, etc. In some examples, the communication circuitry 252 may be configured to facilitate communication via one or more wired media and/or protocols (e.g., Ethernet cable(s), universal serial bus cable(s), etc.) and/or wireless mediums and/or protocols (e.g., near field communication (NFC), ultra high frequency radio waves (commonly known as Bluetooth), IEEE 802.11x, Zigbee, HART, LTE, Z-Wave, WirelessHD, WiGig, etc.).

In some examples, the memory circuitry 256 may comprise and/or store machine readable instructions that may be executed by the processing circuitry 254. In the example of FIG. 2, the memory circuitry 256 comprises and/or stores an image processing workflow designer 400, one or more saved image processing workflows 306, a plurality of workflow processing nodes/blocks 304, and a plurality of image repositories 258. As shown, each image repository 258 comprises one or more images 260 (and/or image files). In some examples, one or more of the stored images 260 may be 2D and/or 3D images generated by the X-ray detector 106 and provided by and/or imported from the scanning system(s) 100. While shown as part of (and/or stored in) the memory circuitry 256 of the computing system 250, in some examples, some or all of the workflow designer 400, workflows 306, processing blocks 304, image repositories 258, and/or images 260 may be part of (and/or stored in) memory circuitry of the remote computing system(s) 299.

In some examples, the workflow designer 400 may provide an interface through which a customized (e.g., ADR) image processing workflow 306 may be configured. In some examples, an image processing workflow 306 may be tailored for the needs of an individual user, such as to assist in recognizing defects in certain workpieces 108, or evaluating the effectiveness of an X-ray scanning system 100. For example, a user might construct a workflow 306 that verifies the existence of required markings on a particular workpiece 108 and/or dimensions of a particular workpiece 108. As another example, a user might construct a workflow 306 that verifies that the X-ray scanning system 100 itself is in acceptable working condition. In some examples, the workflow designer 400 may use visual tools to facilitate design of the workflow 306, such as, for example, node based processing tools. After design of a workflow 306 is finished, the workflow 306 may be saved and/or stored in memory circuitry 256 for future use and/or retrieval.

In some examples, the workflow designer 400 may enable a workflow 306 to be tailored through custom arrangement and/or configuration of different processing blocks 304. Different processing blocks 304 may define and/or perform different functions. In some examples, there may be a variety of different types of processing blocks 304.

For example, some processing blocks 304 may perform an arithmetic function, such as, for example, addition, subtraction, multiplication, division. In some examples, a single arithmetic processing block 304 may be configured to perform any one of these arithmetic functions. As another example, some processing blocks 304 may perform a logical function, such as, for example, AND, OR, NOR, NAND, NOT, XOR, etc. In some examples, a single logical processing block 304 may be configured to perform any one of these logical functions.

As another example, some processing blocks 304 may perform a conditional branching function, such as, for example, IF/THEN. As another example, some processing blocks 304 may perform a looping function, such as, for example a WHILE, FOR, and/or REPEAT loop. As another example, some processing blocks 304 may perform a vector function, such as, for example, vector arithmetic (e.g., addition, subtraction, multiplication, division, etc.), vector creation/combination (e.g., combining or more two numbers to create a vector), vector splitting (e.g., splitting a vector into two or more numbers), and/or identifying vector intersections. In some examples, a single vector processing block 304 may be configured to perform any one of these vector functions.

As another example, some processing blocks 304 may perform an input function, such as, for example, inputting an image 260, image repository 258, number, coordinate, series of numbers or coordinates, logical value (e.g., TRUE/FALSE), file, and/or other item into the workflow 306. In some examples, a single input processing block 304 may be configured to perform any one of these input functions. In examples where the input processing block 304 inputs a 3D image 260, parameters of the input processing block 304 may define a 2D slice of the 3D image.

As another example, some processing blocks 304 may perform an output function, such as, for example, outputting an image (e.g., whole or specific region), number, and/or logical value to an output device 204 of the UI 202 and/or a file (e.g., in memory circuitry 256). In some examples, a single output processing block 304 may be configured to perform any one of these output functions. As another example, some processing blocks 304 may perform a comparison/verification function, such as, for example, comparing an input value to a threshold value/range to verify that the input value is above/below the threshold and/or within a threshold range. As another example, some processing blocks 304 may perform a calibration function, such as, for example, executing a referenced workflow 306 (e.g., verifying correct operation of a scanning system 100) and outputting values from the referenced workflow 306 as part of a current workflow 306 (e.g., to be used as inputs for parameter calibration).

As another example, some processing blocks 304 may perform an image processing function, such as, for example, image filtering (e.g., to blur and/or enhance contrast of an image), image cropping (e.g., selecting a region of interest), polygon image cropping, image expansion (e.g., enlarging a selected image portion by selecting adjacent pixels that are within a threshold brightness), image combination (e.g., combining multiple 2D images into one 3D image), image slicing (e.g., "slicing" a 2D image from a 3D image), image annotation (e.g., adding an annotation to an image), brightness normalization (e.g., adjusting brightness of pixels in image), edge detection (e.g., using a known edge detection algorithm or a custom edge detection algorithm developed via machine learning, object selection (e.g., selecting a portion of an image defined by detected edges), determining image information (e.g., average brightness of image, number of pixels in image, standard deviation of brightness of pixels in image, etc.), determining image area information (e.g., height/width/size/area of image), determining differences between images (e.g., with respect to image information and/or particular non-identical portions), line profiling (e.g., mapping values of pixels along a line in an image), identifying line intersections, identifying a contrast to noise ratio (CNR), identifying a signal to noise ratio (SNR), and/or identifying/selecting locations and/or quantities of pixels above/below a (e.g., brightness) threshold and/or within a threshold range.

In some examples, a user may place an instance of a generic processing block 304, and then configure the instance to operate according to a particular type of processing block 304 (e.g., via selection from a dropdown list of options). In some examples, several processing blocks 304 (and/or block instances) may be grouped together in a customized combination and/or saved for future use as a new type of custom compound processing block 304. For example, a user might group two arithmetic addition blocks together to create a custom three number addition block. In some examples, the resulting custom compound processing block 304 may have a number of inputs and outputs equal to (or no greater than) the total number of inputs and outputs of the several selected processing blocks 304 (and/or block instances). In some examples, connected inputs and/or outputs of the several selected processing blocks 304 (and/or block instances) may be omitted.

In some examples, the workflow designer 400 may provide a canvas 302 onto which processing blocks 304 may be placed, arranged, and/or interconnected to design a workflow 306 (see, e.g., FIGS. 3a-3d). In some examples, an instance 308 of a processing block 304 may be created when a processing block 304 is placed (e.g., dragged and dropped) onto the canvas 302. In some examples, this may allow multiple different instances 308 of the same processing block 304 to be used in different contexts and/or with different results. In some examples, each instance 308 of a processing block 304 may be independently configured, such as, for example, with respect to name, parameters, connections to other processing blocks 304, and/or other properties.

Figure 3A:
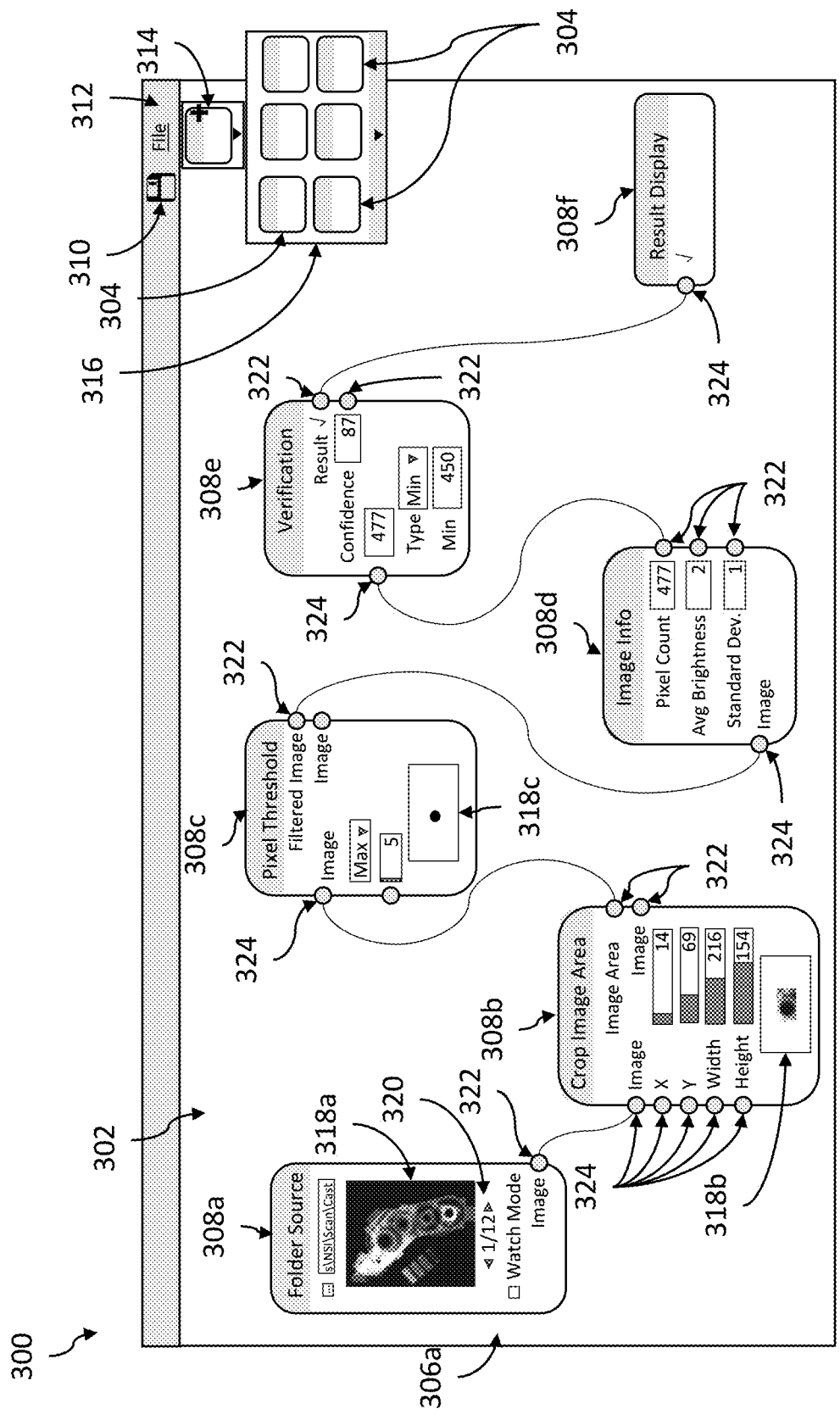
FIGS. 3*a*-3*d* show an example assisted defect recognition (ADR) design interface with various ADR workflows, in accordance with aspects of this disclosure.

FIGS. 3a-3d show examples of a workflow designer interface 300 that might be displayed by the workflow designer 400 (e.g., via output device(s) 204 of the UI(s) 202). As shown, the interface 300 includes a toolbar with a quicksave icon 310 and file menu 312. In the example of FIG. 3a, the interface further includes a dropdown menu 314, which has been selected to reveal a display window 316 of processing blocks 304 that may be placed on the canvas 302. The display window 316 and the dropdown menu 314 have been hidden in the examples of FIGS. 3b-3d.

While shown as unlabeled and identical in the example of FIG. 3a for the sake of simplicity, in some examples, the processing blocks 304 may appear differently in the display window 316, and/or be uniquely labeled. In some examples, a window with additional information about a particular processing block 304 may pop up on the interface 300 in response to a mouse hover or similar interaction. In some examples, the display window 316 showing the different types of processing blocks 304 may be pinned and/or permanently displayed in the interface 300, rather than only being displayed when the dropdown menu 314 is selected. In some examples, custom compound processing blocks 304 may be accessed through the same dropdown menu 314 and/or display window 316. In some examples, compound processing blocks 304 may be accessed differently, such as, for example, via an import function of the file menu 312 and/or some other means.

In the examples of FIGS. 3a-3d, the interface 300 further includes a canvas 302 onto which several block instances 308 of different processing blocks 304 have been placed and interconnected. In some examples, a workflow 306a of block instances 308 arranged on the canvas 302 may be saved via the quicksave icon 310 and/or a save option of the file menu 312. In some examples, a previously saved workflow 306 may be loaded via a load option of the file menu 312. In some examples, the shown workflow 306a may have been recently assembled via the interface 300, or loaded from a previously saved workflow 306. In some examples, the current workflow 306a on the canvas 302 may be run and/or trained via appropriate selections in the file menu 312.

In the example of FIG. 3a, the displayed workflow 306a includes a folder source block instance 308a, a cropped image (or region of interest) block instance 308b, a pixel threshold block instance 308c, an image info block instance 308d, a verification block instance 308e, and a result display block instance 308f.

In the example of FIG. 3a, the folder source block instance 308a is an instance of an input processing block 304 that references a particular image repository 258. In some examples, the user may change which image repository 258 is referenced by modifying one or more parameters of the block instance 308a (e.g., via input(s) to the UI 202). In some examples, when the workflow 306 is run/executed, the workflow designer 400 may process images 260 in the referenced image repository 258 according to the workflow 306 on the canvas 302. In some examples, when a "Watch Mode" option of the folder source block instance 308 is selected, the workflow designer 400 may monitor the selected image repository 258 during execution of the workflow 306, and automatically process any new images 260 (e.g., newly created and/or imported) according to the workflow 306. In this way, a workflow 306 may continuously process new images 260 as they are generated by the X-ray scanning system 100.

In the example of FIG. 3a, the folder source block instance 308a shows an image preview 318a of the first image 260 in the selected image repository 258. While shown in the example of FIG. 3a, in some examples, the image preview 318 may only be shown upon selection of a block instance 308. In some examples, the image preview 318 may be shown in a larger window in response to a particular selection (e.g., double clicking) of the image preview 318 (e.g., via the UI 202). As shown, the folder source block instance 308a has arrows 320 that allow a user to cycle through previews 318a of the other images 260 in the selected image repository 258. In this way, a user might ensure the correct repository 258 is selected and/or gain an understanding of the images 260 in the selected repository 258.

In the example of FIG. 3a, the folder source block instance 308a has a single output 322 corresponding to an image 260 of the selected image repository 258. As shown, the image output 322 of the folder source block instance 308a is depicted as a small circle. The output 322 is connected to an input 324 of the cropped image block instance 308b, which is also depicted as a small circle. As shown, the input 324 of the cropped image block instance 308b corresponds to an image parameter of the cropped image block instance 308b.

In the example of FIG. 3a, the cropped image block instance 308b also includes several other parameters, in addition to the image. In particular, the X and Y parameters correspond to coordinates of a (e.g., central or corner) vertex of a cropping rectangle, while the Height and Width parameters correspond to a height and width of the cropping rectangle. In the example of FIG. 3a, these parameters have been manually set, such as through numerical input in the shown fields and/or adjustment of slider bars. An image preview 318b is shown in the cropped image block instance 308b depicting what the image 260 referenced by the folder source block instance 308a might look like given the current parameters of the cropped image block instance 308b.

In some examples, the interface 300 may allow a user to graphically set the parameters by selecting (e.g., via a cursor) a rectangular area of the image preview 318b or a representative image area (e.g., shown in a larger window). In some examples, one or more of the parameters of the cropped image block instance 308b may be set automatically by connecting the corresponding input(s) 324 to appropriate outputs 322. In some examples, a user may connect an output 322 of a block instance 308 to an input 324 of another block instance 308 by selecting the input 324, output 322, and/or a connection icon (e.g., in the file menu 312 and/or display window 316). In some examples, the connections between block instances 308 may both serve to configure parameters of certain block instances 308 as well as configure the execution sequence of the workflow 306.

In the example of FIG. 3a, the cropped image block instance 308b has two outputs 322. One output 322 corresponds to the newly cropped image, while the other output 322 corresponds to the original (uncropped) image. As shown, the uncropped image output 322 is not connected to another block instance 308. The cropped image output 322 is connected to an image input 324 of the pixel threshold block instance 308c.

In the example of FIG. 3a, the pixel threshold block instance 308c is an instance of a processing block 304 for identifying pixels above/below a brightness threshold and/or within a threshold brightness range. In some examples, this may be useful in identifying certain elements within a black and white and/or grayscale industrial X-ray scanned image 260, which may appear brighter or darker than others. As shown, the parameters of the pixel threshold block instance 308c are configured to filter out pixels that have a brightness that exceeds a maximum set brightness. An image preview 318c of the pixel threshold block instance 308c shows what pixels remain after the filtering.

In some examples, the parameters of the pixel threshold block instance 308c may be alternatively configured to instead filter out pixels that have a brightness that is below a minimum set brightness, or filter out pixels that are outside of a brightness range. While two inputs 324 of the pixel threshold block instance 308c are shown in the example of FIG. 3a, in some examples, the pixel threshold block instance 308c may include more inputs 324 (e.g., to define a threshold range). In some examples, the parameters of the pixel threshold block instance 308c may be alternatively configured to instead filter based on some other property, rather than brightness.

In the example of FIG. 3a, the pixel threshold block instance 308c has an output 322 corresponding to a filtered image with pixels above the maximum set brightness having been removed. This output 322 is connected to an image input 324 of the image info block instance 308d. The image info block instance 308d is an instance 308 of a processing block 304 for determining image information. In the example of FIG. 3a, the image info block instance 308d has several outputs 322 corresponding to different information about the image 260 received via its image input 324. As shown, the pixel threshold block instance 308c shows a preview of the values of the outputs 322, based on the input 324 (and/or any configuration parameters). While the information outputs 322 shown correspond to a number of pixels, an average brightness of the pixels, and standard deviation in brightness of the pixels, in some examples, less or more information may be determined and/or output by the image info block instance 308d (e.g., image area information).

In the example of FIG. 3a, the pixel count output 322 of the image info block instance 308d is connected to an input 324 of the verification block instance 308e. The verification block instance 308 is an instance of a processing block 304 that perform a verification function, such as, verifying whether an input is above/below a threshold and/or within a threshold range. In the shown parameter configuration, the verification block instance 308e verifies that the value of its input 324 (e.g., pixel count) is at least a certain value (i.e. 436). In some examples, the parameters of the verification block instance 308e may be alternatively configured to verify that that its input 324 is no more than a certain value, or within a certain value range.

In the example of FIG. 3a, the minimum value for the verification block instance 308e is shown as being previously set. In some examples, the value may be manually entered by a user. In some examples, the minimum value may be automatically configured by the workflow designer 400 via training. That is, in some examples, instead of manually entering the minimum value, the user may instead select (e.g., via the file menu 312) to train the workflow 306a.

In some examples, selecting to train the workflow 306a will cause the workflow designer 400 to prompt the user to reference an image repository 258 containing training data, similar to the folder source block instance 308a referencing an image repository 258. In some examples, the training data may comprise images 260 the user wishes to analyze to determine a parameter value. In some examples, the workflow designer 400 may prompt the user to reference one image repository 258 containing training data for each folder source block instance 308 (and/or image source block instance 308) on the canvas 302. In some examples, a user may decline to reference training data for a particular folder source block instance 308 (and/or image source block instance 308), and opt instead to use the normally referenced folder (and/or image).

In some examples, once the training data is identified, the workflow designer 400 may process the training data (e.g., images 260) according to the workflow 306a, up to the verification block instance(s) 308. Then, instead of verifying the input values at the verification block instance(s) 308, the workflow designer 400 will configure the minimum/maximum parameter(s) of the verification block instance 308 based on the training image(s) (e.g., using a form of machine learning). In the example of FIG. 3a, training the workflow 306a may result in the workflow designer 400 determining the number of pixels in each training image that are below the maximum threshold in the selected region. The workflow designer may then record the lowest of those numbers as the minimum parameter of the verification block instance 308e. In some examples, the verification block instance 308e might instead record the highest of the numbers, or the highest and the lowest (e.g., if Max, or Range was selected instead of Min).

In some examples, verification block instances 308 may be also be used to verify correct operation of the X-ray scanning system(s) 100. For example, a process control workflow 306 may be constructed to analyze scanned images of special workpieces 108 used just for verifying correct operation of the X-ray scanning system(s) 100. These special workpieces 108 may have well known characteristics and/or properties.

In such an example, the parameters for the verification block instances 308 may be trained using a collection of images depicting the special workpieces 108. In particular, the images may have been generated by the X-ray scanning system 100 when the X-ray scanning system 100 was brand new and/or known to be in good working order. Thereafter, the operational effectiveness of the X-ray scanning system 100 may be evaluated periodically by scanning new images of the special workpieces 108, and processing the new images of the special workpieces 108 using the process control workflow 306 that was previously trained on the old images of the special workpieces 108.

If the verification block instance(s) 308 of the process control workflow 306 report significant differences between the trained values (e.g., from processing the old images) and the new values, the designer 400 may conclude that the X-ray scanning system(s) 100 needs maintenance. In some examples, a corresponding notification to that effect may also be provided (e.g., via UI 202 and/or other communication). In some examples, the X-ray scanning system(s) 100 may be disabled until maintenance can be provided. In some examples, the workflow 306 may include tiers of verification block instances 308, whereby failure of one tier may be interpreted to mean slight degradation in operation, failure of some (but not all) tiers may mean moderate degradation in operation, and failure of many or a majority of tiers may mean serious degradation in operation.

In some examples, the result and/or outputs of a processing control workflow 306 may be used to calibrate an ADR workflow 306. For example, the ADR workflow 306 may include a block instance 308 of a processing block 304 that executes a referenced workflow 306 and outputs values determined through execution of the referenced workflow 306. These outputted values may then be used as inputs for parameter calibration of the ADR workflow 306 (e.g., by adjusting pixel brightness, brightness thresholds, average brightness, contrast values, standard deviations, etc.). Alternatively, the process control workflow 306 may output values to a file, and the ADR workflow 306 may include a block instance 308 of an input processing block 304 that inputs/imports a file (and/or or reads a series of numbers from a file and inputs/imports the numbers).

In the example of FIG. 3a, the verification block instance 308e has a result output 322 and a confidence output 322. The result output 322 is a logical true or false. As shown, the verification block instance 308e previews a true result output 322 via check mark. In some examples, the confidence output 322 may correspond to a degree (and/or percentage) to which the verification block instance 308e is confident that the result output 322 is correct. As shown, the verification block instance 308e previews an 87% confidence that the result output 322 is correct.

In the example of FIG. 3a, the result output 322 of the verification block instance 308e is connected to an input 324 of the result display block instance 308f. The result display block instance 308f is an instance 308 of an output processing block 304 configured to output a result to one or more display output devices 204 of the UI 202. In some examples, the verification block instance 308e may output to one or more other output devices 204 (e.g., speaker(s) and/or haptic output(s)) instead of, or in addition to, the display output device(s) 204. In examples where multiple images 260 are processed by the workflow 306a, the display block instance 308f may provide an output for each image 260. In some examples, the output(s) may be in the form of a graph, chart, spreadsheet, and/or listing. In some examples, the output(s) may indicate to which image 260 each result corresponds.

Figure 3B:
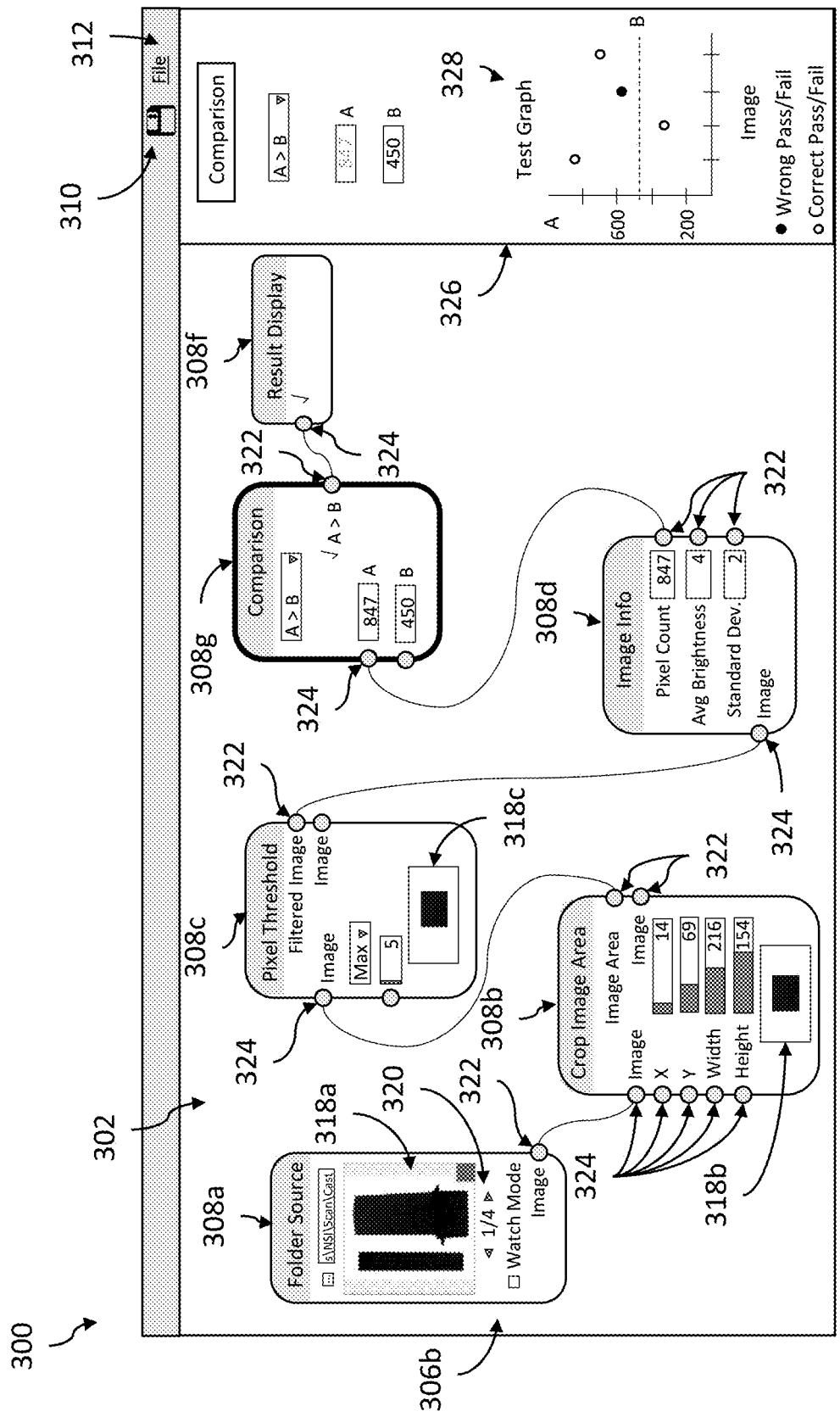

FIG. 3b shows an example of a second workflow 306b. As shown, the workflow 306b is similar to the workflow 306a. However, the workflow 306b includes a comparison block instance 308g instead of a verification block instance 308e.

In some examples, the comparison block instance 308g may be similar to the verification block instance 308e. For example, like the verification block instance 308e, the comparison block instance 308g compares the value of its input 324 (e.g., "A") to a threshold value (e.g., "B") to verify that the former is greater than the latter. In some examples, the comparison block instance 308g may also be configured with training data, similar to that which is discussed above with respect to the verification block instance 308e. While the comparison block instance 308g includes no confidence output 322, the comparison block instance 308g does have a logical TRUE/FALSE result output 322 that previews a true result via a check mark. As shown, the result output 322 of the comparison block instance 308g is connected to the result display block instance 308f.

In the example of FIG. 3b, the user has selected to "test" the workflow 306b (e.g., via an appropriate option of the file menu 312). In some examples, a workflow 306 may be "tested" using a batch of test images corresponding to workpieces 108 of known quality (e.g., good or bad). In some examples, the test images used to test a workflow 306 may be obtained via a scanning system 100.

In some examples, in response to a "test" selection, the designer 400 may provide one or more (e.g., visual) outputs showing the results of the test. In some examples, the output(s) may be in the form of one or more graphs, charts, spreadsheets, and/or other appropriate mediums. In some examples, the test output(s) may indicate how each of test the images was evaluated by the tested workflow 306. This may be helpful, for example, when trying to determine appropriate values to use for comparisons/verifications.

In the example of FIG. 3b, the folder source block instance 308a in the workflow 306b references a different folder, and shows a different image preview 318a, than in the workflow 306a of FIG. 3a. In some examples, this may reflect selection of a "test folder" of test images. As shown, the folder source block instance 308a indicates four test images in the folder.

In the example of FIG. 3b, the interface 300 includes an information pane 326 showing information about the comparison block instance 308g. In some examples, the information pane 326 may show information about whichever block instance 308 is selected. In the example of FIG. 3b, the comparison block instance 308g has been selected, as indicated by the darkened and/or highlighted outline of the comparison block instance 308g, and thus the information pane 326 shows information relating to the comparison block instance 308g.

In the example of FIG. 3b, the information pane 326 also includes a graph 328 showing information about the comparison block instance 308g as it relates to each test image. In particular, the graph 328 shows a circle representing the "A" value of the comparison block instance 308g for each test image, and a dotted line representing the threshold "B" value (i.e., 450) of the comparison block instance 308g. The circles are depicted as either black or white depending on whether the corresponding test image wrongly or correctly passed/failed the comparison test (based on the A/B values and the known quality of the workpiece(s) 108 corresponding to each test image).

In the example of FIG. 3b, the graph 328 shows the first test image had an A value slightly above 700. Since the over 700 A value is greater than the 450 B value (as indicated by the circle being above the dotted line in the graph 328), the workflow 306b determined the first test image passed the comparison test, theoretically indicating a good workpiece 108. The white circle in the graph 328 for the first test image indicates that the workflow 306b was correct in determining that the first test image passed the comparison test, as the first test image does indeed depict a good quality workpiece 108.

In the example of FIG. 3b, the graph 328 shows the second test image had an A value slightly below 400. Since the under 400 A value is less than the 450 B value (as indicated by the circle being below the dotted line in the graph 328), the workflow 306b determined the second test image failed the comparison test, theoretically indicating a bad workpiece 108. The white circle in the graph 328 for the second test image indicates that the workflow 306b was correct in determining that the first test image failed the comparison test, as the second test image does indeed depict a poor quality workpiece 108.

In the example of FIG. 3b, the graph 328 shows the third test image had an A value slightly below 600. Since the under 600 A value is greater than the 450 B value (as indicated by the circle being above the dotted line in the graph 328), the workflow 306b determined the third test image passed the comparison test, theoretically indicating a good workpiece 108. However, the black circle in the graph 328 for the third test image indicates that the workflow 306b was wrong in determining that the third test image passed the comparison test, as the third test image depicts a poor quality workpiece 108.

In some examples, the test graph 328 shown in FIG. 3b may help a user to quickly and easily understand how each test image was evaluated during the test. Furthermore, the successes and/or failures shown in the graph 328 may help a user judge whether the currently set parameters should be adjusted. For example, by looking at the graph 328 a user may be able to quickly see that the B value may need to be raised to be around 600 in order to correctly fail the second and third test images, and correctly pass the first and fourth test images.

Figure 3C:
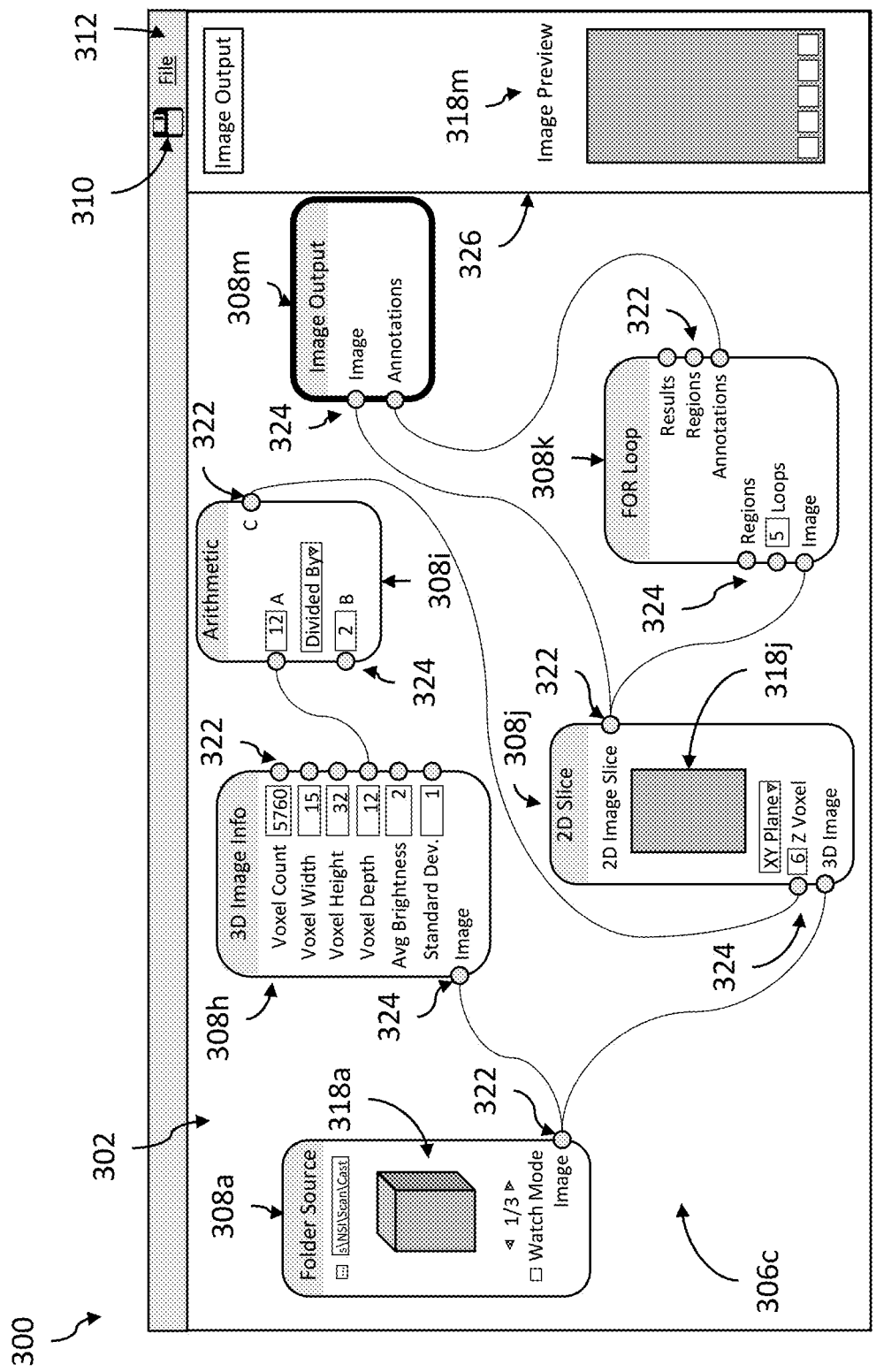

FIG. 3c shows an example of a third workflow 306c. As shown, the workflow 306c includes a folder source block instance 308a, a 3D image info block instance 308h, an arithmetic block instance 308i, an image slicing block instance 308j, a loop block instance 308k, and an image output block instance 308m. In some examples, the workflow 306c may be configured to take a 2D image slice of a 3D volume/image (e.g., via the image slicing block instance 308j), add annotations to the 2D image slice (e.g., via the loop block instance 308k), and output the 2D image slice and annotations (e.g., via the image output block instance 308m).

In the example of FIG. 3c, the folder source block instance 308a references a folder with 3D volumes/images, as indicated by the image preview 318a showing a cubical 3D volume/image. The image slicing block instance 308j is configured to take the cubical 3D volume/image input by the folder source block instance 308a and "slice" off (and/or form) a rectangular 2D image, as indicated by the image preview 318j. While a cubical 3D volume/image and rectangular 2D image slice are used in the example of FIG. 3c for the sake of simplicity, in some examples, the 3D volume/image and/or 2D image slice may be depictions of a more complex workpiece 108.

In the example of FIG. 3c, the image slicing block instance 308j is configured to form a 2D image in the XY plane, such that the 2 dimensional image has dimensions in the X and Y axis (and not the Z axis). As shown, the image slicing block instance 308j receives as an input 324 a number of Z voxels. The Z voxel input 324 determines how far along the Z axis the 2D slice should be taken in the XY plane.

In the example of FIG. 3c, the Z voxel input 324 is received from the arithmetic block instance 308i, based on information supplied by the 3D image info block instance 308h. As shown, the 3D image info block instance 308h provides to the arithmetic block instance 308i the number of voxels of total depth (e.g., along the Z axis) of the 3D image. The arithmetic block instance 308i halves the number of voxels of total depth to obtain the number of voxels of depth to the approximate middle of the 3D image, and provides the result to the Z voxel input 324 of the image slicing block instance 308j.

In some examples, the image slicing block instance 308j may be otherwise configured. For example, the image slicing block instance 308j might be configured to form a 2D image in the XZ or YZ plane, instead of the XY plane. In some examples, the 2D image plane may be otherwise defined, such as via 2 orthogonal (e.g., non X/Y) vectors (e.g., provided as input to the image slicing block instance 308j). In such examples, a third vector may be determined based on the two vectors defining the 2D image plane, and the voxel input 324 may pertain to that third vector. In some examples, the image slicing block instance 308j may allow for graphical selection of the 2D image slice (and/or the parameters necessary to take the 2D image slice), such as, for example, via (e.g., cursor) selection of an appropriate portion in the image preview 318j (and/or an associated information pane/window).

In the example of FIG. 3c, the image output block instance 308m receive the 2D image slice from the image slicing block instance 308j. As shown, the image output block instance 308m also receives annotations from the loop block instance 308k. The image output block instance 308m is further shown as being selected, as indicated by the darkened and/or highlighted outline of the image output block instance 308m. The information pane 326 thus shows information pertaining to the image output block instance 308m. In particular, the information pane 326 shows an image preview 318m of the 2D image slice (e.g., provided by the image slicing block instance 308j) with several white square annotations (e.g., provided by the loop block instance 308k).

In the example of FIG. 3c, the loop block instance 308k is configured to process (e.g., annotate) the 2D image over five loop iterations. The precise way in which the loop block instance 308k processes the 2D image may be configured through a loop workflow 306d, such as discussed below with respect to FIG. 3d. While the loop block instance 308k outputs annotations to the image output block instance 308m in the example of FIG. 3c, in some examples the loop block instance 308k may alternatively, or additionally, output a modified image (with or without annotations), one or more regions of an image (with or without annotations), and/or one or more boolean results (e.g., indicating whether annotations were added).

Though manually set to five loops in the example of FIG. 3c (e.g., via direct user input), in some examples, the number of loops of the loop block instance 308k may be dynamically determined. For example, the number of loops may be determined by a different block instance 308 and passed to the loop block instance 308k. In some examples, the loop block instance 308k may be configured to operate on a plurality of (e.g., cropped) 2D image regions rather than an entire 2D image. In such examples, the loop block instance 308k may receive a set (and/or list, array, etc.) of regions via the regions input 324. In examples where the loop block instance receives a set of regions, the number of loops may be automatically determined to be equal to the number of regions in the set of regions.

Figure 3D:
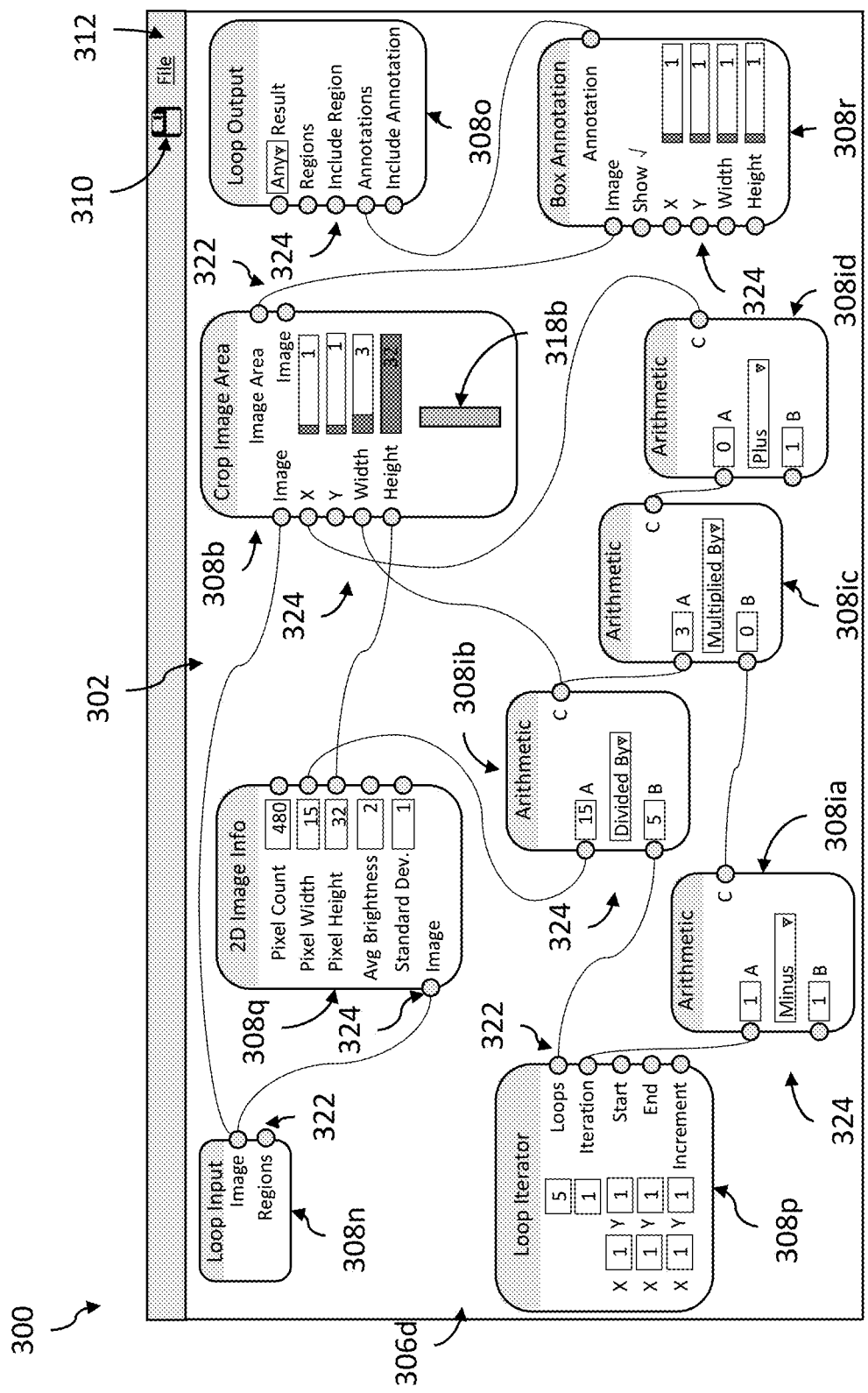

FIG. 3d shows an example of a workflow 306d defined by, and/or encompassed within, the loop block instance 308k of the workflow 306c shown in FIG. 3c. In some examples, the loop workflow 306d may be accessed by a particular selection (e.g., double clicking) of the loop block instance 308k. While not shown in the example of FIG. 3d, in some examples, the interface 300 may include one or more visual icons that allow for switching between a main workflow (e.g., the workflow 306c) and an embedded sub-workflow (e.g., the loop workflow 306d).

In the example of FIG. 3d, the loop workflow 306d includes several block instances 308. In particular, the loop workflow 306d includes a loop input block instance 308n, a loop output block instance 308o, a loop iterator block instance 308p, a 2D image info block instance 308q, a cropped image (or region of interest) block instance 308b, several arithmetic block instances 308i, and a box annotation block instance 308r. Given that the loop block instance 308k includes within it these several block instances 308 of the loop workflow 306d, in some examples, the loop block instance 308k may be considered a compound block instance 308.

In the example of FIG. 3d, the loop input block instance 308n inputs into the workflow 306d the image (and/or image regions) to be processed by the workflow 306d. As shown, the image output 322 and regions output 322 of the loop input block instance 308*n* correspond to the image input 324 and regions input 324 of the loop block instance 308*k* of FIG. 3*c*. In this way, the workflow 306*d* may process the image and/or regions passed to the loop block instance 308*k* in the workflow 306*c*.

In the example of FIG. 3*d*, the loop iterator block instance 308*p* has outputs 322 for the number of loops and the current loop iteration, allowing these variables to be used in the operation of the loop workflow 306*d*. As shown, the loop and iteration outputs 322 of the loop iterator block instance 308*p* are connected to inputs 324 of the arithmetic block instances 308*i*. While not used in the example of FIG. 3*d*, the depicted loop iterator block instance 308*p* also provides the ability to iterate through various (e.g., XY) coordinates via the start, end, and increment outputs 322.

In the example of FIG. 3*d*, the image output 322 of the loop input block instance 308*n* is connected to image inputs 324 of the 2D image info block instance 308*q* and cropped image block instance 308*b*. The cropped image block instance 308*b* uses information from the 2D image info block instance 308*q* and arithmetic block instances 308*i* to select/crop a thin rectangular region of the rectangular 2D image slice each iteration (e.g., as shown in the image preview 318*b*). In particular, the cropped image block instance 308*b* uses information from the 2D image info block instance 308*q* and arithmetic block instances 308*i* to ensure that each rectangular region selected each iteration is one fifth the size of the entire rectangular 2D image slice (e.g., so that the entire rectangular 2D image slice is processed over five loops).

In the example of FIG. 3*d*, the box annotation block instance 308*r* receives the region cropped/selected by the cropped image block instance 308*b* each iteration. Each iteration, the box annotation block instance 308*r* places an annotation on the cropped/selected region. More specifically, the box annotation block instance 308*r* places a box of a specified size at a specified place in the cropped/selected region each iteration.

As shown, the parameters of the box annotation block instance 308*r* define the size (e.g., width and height) and placement (e.g., corner/center X and Y coordinates) of the box. In particular, the parameters of the box annotation block instance 308*r* specify that a 1×1 box be placed at (1, 1) XY coordinates of the cropped/selected region each iteration. Though the same coordinates are always used to place the box annotation, the coordinates are relative to the particular cropped/selected region being operated on in that iteration, so there are no overlapping and/or redundant annotations (as long as there are no overlapping and/or redundant regions).

Nevertheless, the box annotation block instance 308*r* is configured to also keep track of the absolute placement of each annotation with respect to the larger (e.g., uncropped) image. In some examples, the box annotation block instance 308*r* may further output the annotations with metadata that similarly allows the annotations to be correctly shown and/or placed in the larger (e.g., uncropped) image by other block instances 308 (as shown, for example, in the image preview 318*m* of the image output block instance 308*m* of FIG. 3*c*). This makes the box annotation block instance 308*r* an especially helpful tool when annotating different regions of a larger image.

While the parameters of the box annotation block instance 308*r* have been manually set in the example of FIG. 3*d*, in some examples, the parameters may be dynamically set (e.g., via outputs 322 from other block instances 308). In the example of FIG. 3*d*, the box annotation block instance 308*r* also includes a Show input 324 that allows for dynamic determination of whether an annotation is added/included (e.g., where an annotation is not added/included if Show=FALSE).

Though shown as a box annotation block instance 308*r* in the example of FIG. 3*d*, in some examples, a different type of annotation block instance 308 may be used. For example, a text annotation block instance 308 might be used to add annotate an image with text instead of a box. In such an example, one of the parameters might be the text to use for the annotation (e.g., rather than the size of the box). As another example, an arrow or pixel annotation block instance 308 might be used to annotate an image with an arrow or certain pixels. In such examples where an arrow or pixel annotation is used, the arrow/pixel annotation block instance 308 would have appropriate associated parameters (e.g., vector parameters for the arrow, pixel position(s)/color(s), etc.).

In the example of FIG. 3*d*, the loop output block instance 308*o* receives the annotations from the box annotation block instance 308*r*. These annotations received as input 324 at the loop output block instance 308*o* correspond to the annotations output 322 that is part of the loop block instance 308*k* of the workflow 306*c* in FIG. 3*c*. In some examples, the annotations data passed between block instances includes relative positioning information to allow annotations placed on a region of an image to also be correctly placed/shown when the entire image is output (e.g., as exhibited in the image preview 318 of the information pane 326 in FIG. 3*c*).

In the example of FIG. 3*d*, the loop output block instance 308*o* has other inputs 324 that might impact the output(s) 322 of the loop block instance 308*k* of the workflow 306*c* in FIG. 3*c*. For example, the loop output block instance 308*o* may disregard annotations received during a loop instance where the Include Annotations input 324 is FALSE, and/or only record/recognize annotations during where the Include Annotations input 324 is TRUE or unconnected. As another example, the loop output block instance 308*o* may disregard regions received during a loop instance where the Include Regions input 324 FALSE, and/or only record/recognize regions received when the Include Regions input 324 is TRUE or unconnected. In some examples, the loop block instance 308*k* may only output those annotations and/or regions that were recorded/recognized by the loop output block instance 308*o* according to the Include Annotations/Regions inputs 324.

In the example of FIG. 3*d*, the loop output block instance 308*o* also has a Result input 324 that corresponds with the Result output 322 of the loop block instance 308*k* of the workflow 306*c* in FIG. 3*c*. In some examples, the Result output 322 may be a boolean value (e.g., TRUE/FALSE). In some examples, the Result output 322 of the loop block instance 308*k* may be configured to be TRUE if the Result input 324 of the loop output block instance 308*o* was TRUE during any loop iteration. In some examples, the Result output 322 of the loop block instance 308*k* may be configured to be TRUE only if the Result input 324 of the loop output block instance 308*o* was TRUE during all loop iterations. As shown, the loop output block instance 308*o* has a dropdown menu next to the result input 324 allowing a user to select whether the result output 322 of the loop block instance 308*k* is configured under the any or all approach.

Figure 4:
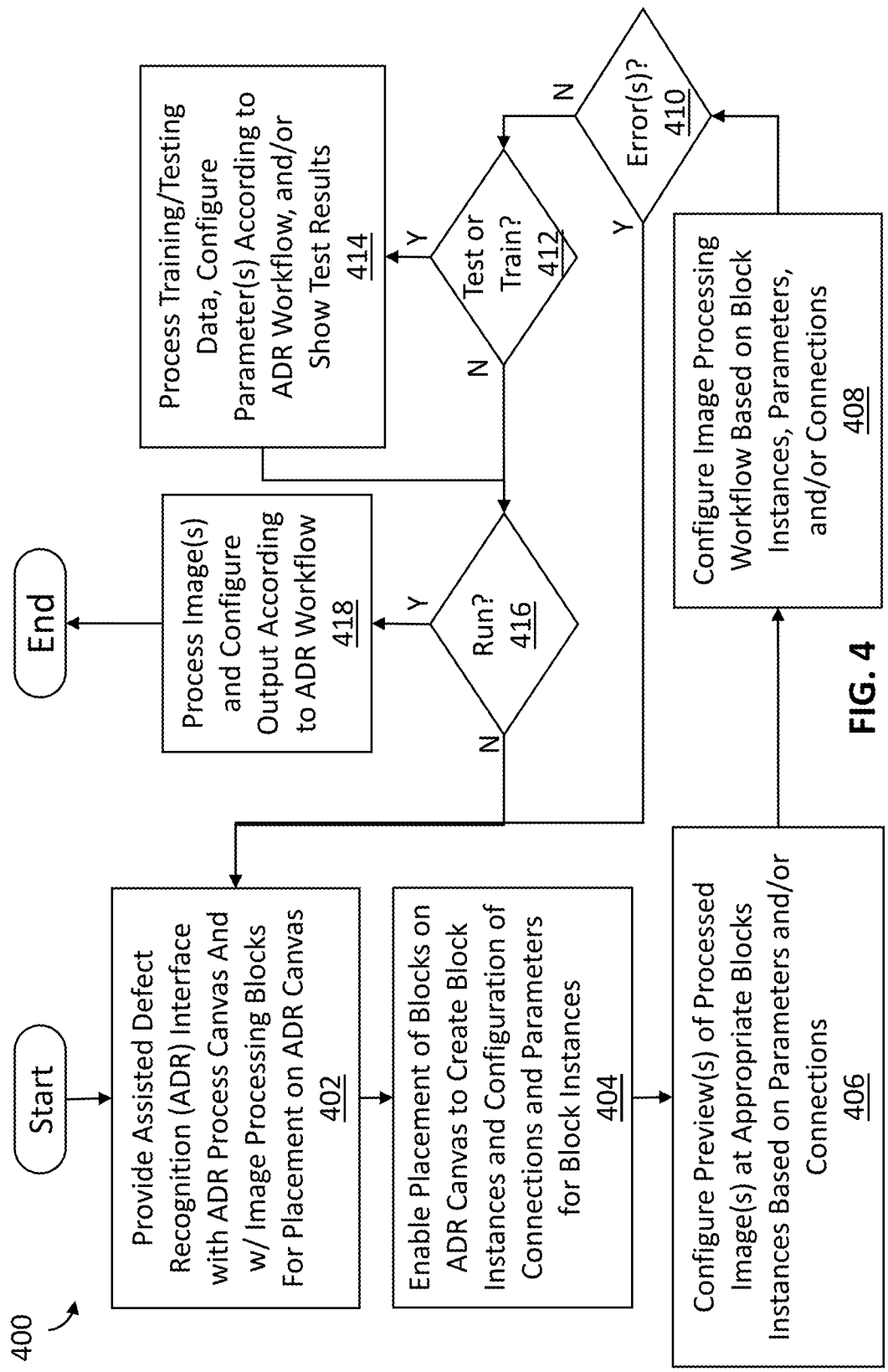
FIG. 4 is a flowchart illustrating operation of an example ADR designer, in accordance with aspects of this disclosure.

FIG. 4 is a flowchart illustrating example operation of the workflow designer 400. In some examples, the workflow designer 400 may be implemented in machine readable (and/or processor executable) instructions stored in memory circuitry 256 and/or executed by the processing circuitry 254.

In the example of FIG. 4, the workflow designer 400 begins at block 402. At block 402, the workflow designer 400 provides the ADR interface 300 to the user via one or more (e.g., display) output devices 204 of the UI 202. In some examples, this may include providing the canvas 302 and/or display window 316 of processing blocks 304 that may be used to create a workflow 306 on the canvas 302. In some examples, the canvas 302 may be blank. In some examples, the canvas 302 may be populated by block instances 308 of an existing workflow 306 that has been loaded from memory.

In the example of FIG. 4, the workflow designer 400 proceeds to block 404 after block 402. At block 404, the workflow designer 400 enables new placements and/or interconnections of block instances 308 on the canvas 302. In some examples, the workflow designer 400 may also enable appropriate configurations of the block instances 308, including internal configurations of compound block instances 308.

In the example of FIG. 4, the workflow designer 400 proceeds to block 406 after block 404. At block 406, the workflow designer 400 configures, generates, and/or displays (e.g., via UI 202) one or more image previews 318 and/or output previews for one or more block instances 308. In some examples, the image preview(s) 318 and/or output preview(s) may be configured, generated, and/or displayed based on one or more configurations and/or connections of the block instance(s) 308. In some examples, the image preview(s) 318 and/or output preview(s) may be configured, generated, and/or displayed in response to user selection of the block instance(s) 308.

In the example of FIG. 4, the workflow designer 400 proceeds to block 408 after block 406. At block 408, the workflow designer 400 configures the workflow 306. In some examples, the workflow designer 400 may configure the workflow 306 based on the block instances 308 on the canvas 302, as well as the interconnections between block instances 308 and the configurations of each block instance 308.

In the example of FIG. 4, the workflow designer 400 proceeds to block 410 after block 408. At block 410, the workflow designer 400 checks to see if there are any errors in the current workflow 306. For example, the workflow designer 400 may check to make sure there are no vital parameter values that are null or zero, that there is at least one input block instance 308 connected (directly or indirectly) to at least one output block instance 308, and/or that a selected image 260 (or images(s) 260 in a repository 258) is/are of an appropriate format. In some examples, the designer 400 may also check to make sure the same number of images 260 are in each repository 258 referenced by the workflow 306. However, in some examples, different number of images 260 in different repositories 258 may be allowed, handled by the designer 400, and/or considered a warning, rather than being considered an error. In some examples, the workflow designer 400 may provide one or more outputs (e.g., via UI 202) explaining any error(s) and/or warning(s), and/or how to fix the error(s) and/or warning(s). As shown, the workflow designer 400 returns to block 402 if there are any errors.

In the example of FIG. 4, the workflow designer 400 proceeds to block 412 after block 410 if there are no errors found at block 410. At block 412, the workflow designer 400 determines whether the user has selected to train and/or test the workflow 306. If the workflow designer 400 determines the user has selected to train and/or test the workflow 306, the workflow designer 400 proceeds to block 414.

At block 414, the workflow designer 400 prompts the user for reference to an image repository 258 containing training and/or testing data (e.g., images 260). Once the training and/or testing data is provided, the workflow designer 400 processes the training and/or testing data according to the block instances 308, connections, and configurations of the workflow 306 (e.g., beginning at the image input block instance(s) 308). The workflow designer then configures the parameter(s) in the appropriate verification/comparison block instance(s) 308 accordingly, and/or provides one or more graphs and/or charts showing the outcome(s) of the verification(s)/comparison(s) (as well as the validity of the outcome(s)) with respect to the test data and/or parameter configuration(s).

In the example of FIG. 4, the workflow designer 400 proceeds to block 416 after block 414, or after block 412 if the workflow designer 400 determines that the user has not selected to train the workflow 306. At block 416, the workflow designer 400 determines whether the user has selected to run/execute the workflow 306. If so, the workflow designer 400 proceeds to block 418. At block 418, the workflow designer 400 processes the images 260 (and/or other inputs) input into the workflow 306 according to the block instances 308, connections, and configurations of the workflow 306. In some examples, the workflow designer 400 may continue executing the workflow 306 until explicitly told to end (e.g., in Watch Mode).

In the example of FIG. 4, the workflow designer 400 ends after block 418. However, in some examples, the workflow designer 400 may instead return to block 402 after block 418. As shown, the workflow designer 400 returns to block 402 after block 416 if the workflow designer 400 determines whether the user has not selected to run/execute the workflow 306. While shown as decision blocks 412 and 414 in the flowchart of FIG. 4, in some examples, user selection to train and/or execute the workflow 306 may be implemented as interrupts.

The disclosed examples of the workflow designer 400 use visual tools (e.g., node/block based processing tools) to enable easy customization of workflows 306 tailored for X-ray scanning systems 100. Using the workflow designer 400, a user can create a workflow 306 specifically designed to perform ADR on images generated by X-ray scanning systems 100. Additionally, the workflow designer 400 can train an ADR workflow 306 to automatically set certain parameters that may, for example, define a defect. Trained process control workflows 306 can also be used determine how effectively an X-ray scanning system 100 is operating, and outputs of the process control workflows 306 can be used to further calibrate ADR workflows 306.

The present methods and/or systems may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC), a graphic processing unit (GPU), a reduced instruction set computer (RISC) processor with an advanced RISC machine (ARM) core, etc. The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like. Memory can include, for example, a non-transitory memory, a non-transitory processor readable medium, a non-transitory computer readable medium, non-volatile memory, dynamic RAM (DRAM), volatile memory, ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), etc. The memory can be configured to store code, instructions, applications, software, firmware and/or data, and may be external, internal, or both with respect to the processor.

As used herein, the term "canvas" refers to a graphical workspace or interface within which a user may graphically manipulate the contents of the workspace or interface, such as by manipulating and/or interacting with fields, parameters, connections, and/or configurations of processing block instances.

Disabling of circuitry, actuators, and/or other hardware may be done via hardware, software (including firmware), or a combination of hardware and software, and may include physical disconnection, de-energization, and/or a software control that restricts commands from being implemented to activate the circuitry, actuators, and/or other hardware. Similarly, enabling of circuitry, actuators, and/or other hardware may be done via hardware, software (including firmware), or a combination of hardware and software, using the same mechanisms used for disabling.

What is claimed is:

1. An assisted defect recognition (ADR) control system, comprising:
   a display;
   a processor; and
   a computer readable storage medium storing a plurality of input images at an image storage location, the image storage location comprising a storage location of an image repository, the plurality of images comprising a first input image and a second input image, the first input image or the second input image comprising an image of an industrial part, the computer readable medium further comprising computer readable instructions which, when executed, cause the processor to:

provide a design interface via the display, the design interface comprising a canvas, an input image block, and several image processing blocks, the input image block being representative of an input image function, and each of the image processing blocks being representative of an image processing function, wherein the input image block can be placed on the canvas to create an input image block instance that references the first input image, the second input image, or the image storage location, and wherein an image processing block of the image processing blocks can be placed on the canvas to create an instance of the image processing block, show, on the display, a first preview of the first input image (i) as part of the input image block instance, or (ii) in response to selection of the input image block instance, show, on the display, an input image block instance boundary of the input image block instance, and a user interface element within the input image block instance boundary, enable a user to select the user interface element, in response to the user interface element being selected, show, on the display, a second preview of the second input image, configure an image processing workflow based on instances of the image processing blocks on the canvas, the input image block instance on the canvas, and connections between the input image block and the instances of the image processing blocks on the canvas, perform a quality assurance analysis of the industrial part comprised by the first input image or the second input image via the image processing workflow, and output a result of the analysis.

2. The ADR control system of claim 1, wherein the computer readable instructions, when executed, further cause the processor to:

enable a user to connect inputs and outputs of the instances of the image processing blocks on the canvas of the design interface, enable the user to specify a value or range of a parameter used in at least one of the instances of the image processing blocks, and configure the image processing workflow based on the connections of the inputs and outputs of the instances of the image processing blocks on the canvas, as well as the value or range of the parameter.

3. The ADR control system of claim 2, wherein the computer readable instructions, when executed, further cause the processor to determine the value or range of the parameter based on a training of the image processing workflow using a plurality of training images.

4. The ADR control system of claim 1, wherein the result is a Boolean value.

5. The ADR control system of claim 1, wherein the computer readable instructions, when executed, further cause the processor to:

in response to the user interface element being selected and a new image being stored in the image repository, perform a new analysis of the new image via the image processing workflow, and output a new result of the new analysis.

6. The ADR control system of claim 5, wherein the new image is an image generated by an X-ray scanner, or a three dimensional (3D) volume constructed from images generated by the X-ray scanner, the image or 3D volume being representative of a component or assembly scanned by the X-ray.

7. The ADR control system of claim 1, wherein the image processing blocks comprise a region selection function, an edge detection function, an object selection function, a brightness adjustment function, an image expansion function, an image information function, an image difference function, an image annotation function, an image combination function, an image slicing function, a line profiling function, a signal to noise ratio function, a contrast to noise ratio function, or a thresholding function.

8. The ADR control system of claim 1, wherein the first or second input image is a two dimensional (2D) image of the industrial part that is generated by an X-ray scanner, or a three dimensional (3D) volume of the industrial part constructed from images of the industrial part generated by the X-ray scanner, the 2D image or 3D volume being representative of the industrial part.

9. A method of facilitating design of custom assisted defect recognition (ADR) workflows, comprising:

storing a plurality of images at an image storage location, the image storage location comprising a storage location of an image repository, the plurality of images comprising a first input image and a second input image, the first input image or the second input image comprising an image of an industrial part;

providing a design interface via a display, the design interface comprising a canvas, an input image block, and several image processing blocks, the input image block being representative of an input image function, and each of the image processing blocks being representative of an image processing function, wherein the input image block can be placed on the canvas to create an input image block instance that references the first input image, the second input image, or the image storage location, and wherein an image processing block of the image processing blocks can be placed on the canvas to create an instance of the image processing block;

showing, on the display, a first preview of the first input image (i) as part of the input image block instance, or (ii) in response to selection of the input image block instance, showing, on the display, an input image block instance boundary of the input image block instance, and a user interface element within the input image block instance boundary, in response to the user interface element being selected, showing, on the display, a second preview of the second input image;

configuring, via processing circuitry, an image processing workflow based on instances of the image processing blocks on the canvas, the input image block instance on the canvas, and connections between the input image block and the instances of the image processing blocks on the canvas;

performing a quality assurance analysis of the industrial part comprised by the first input image or the second input image via the image processing workflow, and outputting a result of the analysis.

10. The method of claim 9, further comprising:

enabling the user to connect inputs and outputs of the instances of the image processing blocks on the canvas of the design interface;

enabling the user to specify a value or range of a parameter used in at least one of the instances of the image processing blocks; and configuring the image processing workflow based on the connections of the inputs and outputs of the instances of the image processing blocks on the canvas, as well as the value or range of the parameter.

11. The method of claim 10, further comprising determining the value or range of the parameter based on a training of the image processing workflow using a plurality of training images.

12. The method of claim 9, wherein the result is a Boolean value.

13. The method of claim 9, the method further comprising:

in response to the user interface element being selected and a new image being stored in the image repository, performing a new analysis of the new image via the image processing workflow, and outputting a new result of the new analysis.

14. The method of claim 13, wherein the new image is an image generated by an X-ray scanner or a three dimensional (3D) volume constructed from images generated by the X-ray scanner, the image or 3D volume being representative of a component or assembly scanned by the X-ray scanner.

15. The method of claim 9, wherein the image processing blocks comprise a region selection function, an edge detection function, an object selection function, a brightness adjustment function, an image expansion function, an image information function, an image difference function, an image annotation function, an image combination function, an image slicing function, a line profiling function, a signal to noise ratio function, a contrast to noise ratio function, or a thresholding function.

16. The method of claim 9, wherein the first or second input image is a two dimensional (2D) image of an industrial part that is generated by an X-ray scanner, or a three dimensional (3D) volume of the industrial part constructed from images of the industrial part generated by the X-ray scanner, the 2D image or 3D volume being representative of the industrial part.

* * * * *